United States Patent [19]

Wattonville

[11] Patent Number: 5,743,341
[45] Date of Patent: Apr. 28, 1998

[54] TOOLBAR MOUNTING STRUCTURE PROVIDING TOOL ADJUSTMENT IN THE HITCH AREA

[75] Inventor: Jason Daniel Wattonville, Maxwell, Iowa

[73] Assignee: Deere & Company, Moline, Ill.

[21] Appl. No.: 717,333

[22] Filed: Sep. 20, 1996

[51] Int. Cl.$^6$ ............................................. A01B 13/08
[52] U.S. Cl. .................... 172/451; 172/613; 172/691; 172/694; 172/741; 172/763; 172/775
[58] Field of Search ........................... 172/691, 696, 172/763, 451, 439, 613, 685, 681, 694, 697, 778, 741, 775, 776; 280/495; 403/3, 4

[56] References Cited

U.S. PATENT DOCUMENTS

| | | |
|---|---|---|
| 3,951,214 | 4/1976 | Ramsower ............... 172/691 X |
| 4,035,093 | 7/1977 | Redshaw ....................... 403/4 |
| 4,069,874 | 1/1978 | Buck et al. ............... 172/451 X |
| 4,073,346 | 2/1978 | Groth et al. ............. 172/451 X |
| 4,128,131 | 12/1978 | Bucher et al. ........... 172/451 X |
| 4,189,006 | 2/1980 | Van Der Lely ........... 172/691 X |
| 4,195,696 | 4/1980 | Lundin ....................... 172/451 |
| 4,245,458 | 1/1981 | Smith ...................... 172/451 X |
| 4,336,844 | 6/1982 | Helbig et al. ........... 172/451 X |
| 4,729,435 | 3/1988 | Urich . | |

*Primary Examiner*—Michael J. Carone
*Assistant Examiner*—Christopher J. Novosad

[57] ABSTRACT

Integral hitch and standard mounting structure for a toolbar includes a first embodiment having a hitch tube connected to a three point hitch and to a rear toolbar. Brackets located a substantial distance outwardly of the hitch connect the hitch tube to the toolbar in parallel, rearwardly offset relationship to provide sufficient space between the tube and toolbar for lateral adjustment of tool brackets. Upright plate structure fixed relative to the front face of the toolbar has slotted extensions which project above and below the toolbar. Tool standard mounting bracket structure includes an upper L-shaped member having a horizontal leg positioned against the top of the toolbar and an upstanding bolt-receiving leg positioned against the upper slotted extension. A lower L-shaped member having a downturned bolt-receiving leg is fixed to the top of the tool standard and is positioned against the bottom of the toolbar and against the lower slotted extension. Bolts extending horizontally through the legs and the slotted extensions and bolts extending vertically through apertures in the aft ends of the L-shaped members behind the aft face of the toolbar, secure the tool in the desired location along the toolbar. In an alternate embodiment, a shortened hitch tube having a width approximately equal to the hitch with width approximately equal to hitch width is utilized.

20 Claims, 4 Drawing Sheets

(ALT. EMBODIMENT)

TOOLBAR MOUNTING STRUCTURE PROVIDING TOOL ADJUSTMENT IN THE HITCH AREA

BACKGROUND OF THE INVENTION

1) Field of the Invention

The present invention relates generally to agricultural toolbars, and, more specifically, to hitch and transversely adjustable tool mounting structure for such toolbars.

2) Related Art

In recent years, farmers have used deep tillage tools such as rippers mounted by brackets and transversely positionable on toolbars to rip on the row, between the rows, or at various row spacings. The toolbar is supported from the tractor by a three point hitch, and one problem that arises with such structure is interference between the mounting brackets for the ripper standards and the toolbar-mounted hitch, particularly for certain ripper spacings. Typical structures for avoiding hitch and bracket interference utilize a special integral hitch bolted to the toolbar and offset forwardly of the toolbar to allow the farmer to slide the bolted connection out of the way of the ripper standards. However, the offset hitch design requires providing numerous extra components and completely removing parts and loosening many bolts during the adjustment process. If a desired tool spacing results in location of the mounting brackets at locations corresponding to the offset hitch location, a time-consuming and inconvenient adjustment procedure is necessitated. Also, maintaining tight connections with good load transfer characteristics between the tools and the towing vehicle have been a problem.

Other types of structures wherein the toolbar hitch is bolted directly to the toolbar reduce the number of standard spacings that are available to the farmer since the mounting brackets cannot be placed at the hitch locations on the toolbar. In toolbar structures such as shown in U.S. Pat. No. 4,729,435, two sets of mast structures are fixed to the toolbar with one set used when tilling between rows of crops before harvest and another set used when tilling in the rows after harvest.

BRIEF SUMMARY OF THE INVENTION

It is therefore an object of the present invention to provide an improved integral hitch and standard mounting structure for a toolbar. It is a further object to provide such an improved structure which overcomes most or all of the above-mentioned problems.

It is a further object of the present invention to provide an improved integral hitch and standard mounting structure for a toolbar which avoids interference between the tool standard mounting and the hitch. It is a further object to provide such a structure which facilitates direct mounting of the hitch to the drawbar while still retaining tool spacing flexibility in the hitch area of the toolbar. It is still another object to provide such a structure which obviates substantial fore-and-aft offset of the integral hitch relative to the toolbar and which does not require more than one set of mast structures.

It is yet another object of the present invention to provide an improved integral hitch and standard mounting structure for a toolbar which reduces the number of parts when compared with at least most offset integral hitch structures. It is a further object to provide such a structure that facilitates lateral tool adjustment in the hitch area and obviates removal of hitch components during lateral adjustments of the tools. It is still another object to provide such a structure wherein most or all required tool spacing adjustments in the hitch area can be achieved easily by sliding movement without need to remove hitch or mounting components. It is another object to provide such a structure wherein the number of components is kept to a minimum to reduce cost and complexity, improve stability and load transfer characteristics, and simplify adjustment procedures.

An integral hitch and standard mounting structure for a toolbar constructed in accordance with the teachings of the present invention includes a first embodiment having an elongated hitch tube connected to a three point hitch and to a rear toolbar. Tube brackets connect the ends of the hitch tube to the toolbar a substantial distance outwardly of the hitch area. The tube and toolbar are maintained in parallel, rearwardly offset relationship to provide sufficient space between the tube and toolbar for lateral adjustment of tool brackets connected to the toolbar without need to remove upright mounting bracket bolts located between the tube and toolbar. The tube brackets are adjustable transversely to accommodate any desired tool spacing outwardly of the central portion of the toolbar and provide excellent load transfer between the toolbar and hitch tube. The tube brackets also assure that the spacing between the tube ends and toolbar remains uniform after the central portions are welded together.

Upright plate structure is fixed relative to the front face of the toolbar at a central hitch location and includes slotted extensions which project above and below the top and bottom faces of the toolbar. Tool standard mounting bracket structure includes an upper L-shaped member having a horizontal leg positioned against the top of the toolbar and an upstanding bolt-receiving leg positioned against the upper slotted extension. A lower L-shaped member, shaped similarly to the upper member but having a downturned bolt-receiving leg, is fixed to the top of the tool standard and is positioned against the bottom of the toolbar and against the lower slotted extension. Bolts extending horizontally through the legs and the slotted extensions and bolts extending vertically through apertures in the aft ends of the L-shaped members adjacent the aft face of the toolbar secure the tool in the desired location along the toolbar. To readjust tool location along the slots, the bolts are loosened and the tool standard mounting bracket structure and tool standard are slid to the new position.

In an alternate embodiment, the hitch tube is shortened and has a dimension comparable to the width of the three point hitch so there is no interference between the tube tool brackets located outwardly of the central hitch area on the toolbar. Tool mounting bracket structure similar to that mentioned directly above connects the tool to the toolbar.

The slotted plate design allows the integral hitch to be welded, rather than bolted, directly to the hitch tube without compromising tool spacing around the hitch area. The cost, complexity and number of components required for the slotted plate design is reduced substantially and strength and load transfer characteristics are improved, compared to those for a typical bolted offset hitch design. In addition, some readjustments of tool spacing in the hitch area of the toolbar are accomplished by simply loosening bolts rather than completely removing components, while other readjustments require only the removal of two bolts. The structure provides numerous combinations of tool locations, including those for in row and between row tillage operations, without interference from the hitch or tube brackets.

These and other objects, features and advantages of the present invention will become apparent to one skilled in the art upon reading the following detailed description in view of the drawings.

DETAILED DESCRIPTION OF THE DRAWINGS

Figure 1:
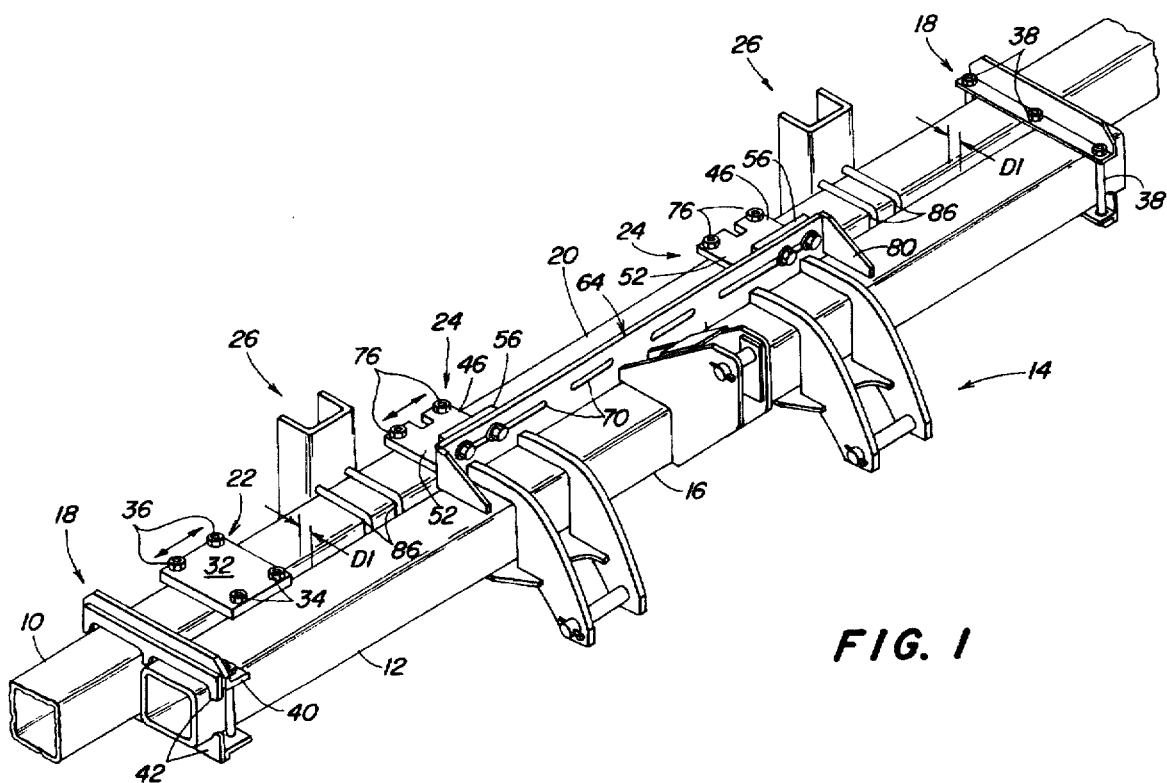
FIG. 1 is a front perspective view of the hitch and mounting structure.
Figure 2:
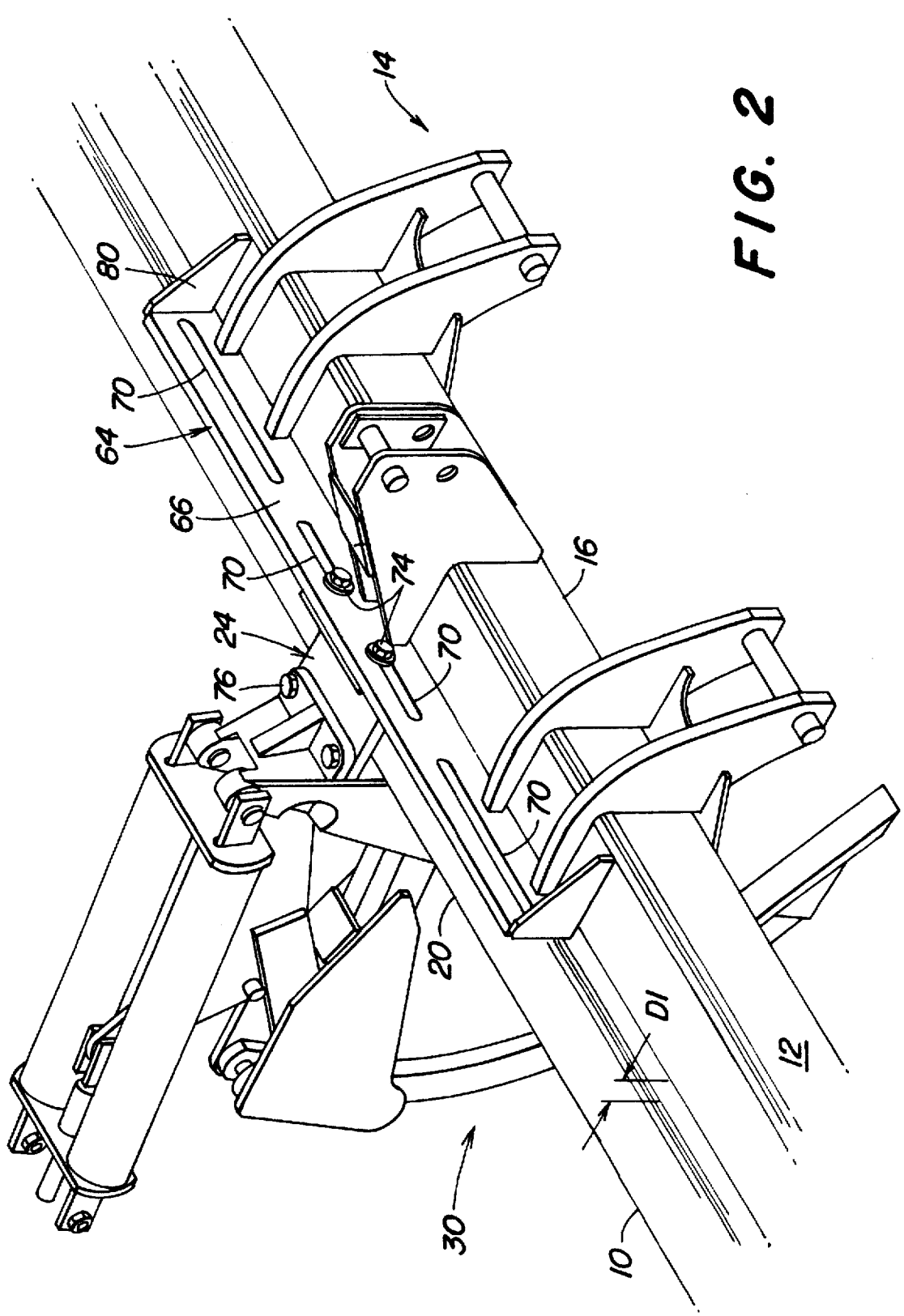
FIG. 2 is an enlarged front perspective view of the central portion of the structure of FIG. 1.

Referring now to FIGS. 1 and 2, therein is shown a toolbar 10 connected to a hitch tube 12. Three point hitch structure 14 adapted for connection to the upper link and lower draft links of a tractor hitch (not shown) is connected to a central portion 16 of the hitch tube 12. Spacer brackets 18 extend between the outermost ends of the hitch tube 12 and the toolbar 10 at areas located on opposite sides of a central toolbar section 20 to secure the toolbar 10 and tube 12 in parallel spaced relationship. Preferably, the toolbar 10 is fixed at the central section 20 to the central portion 16 of the hitch tube 12 by welding or other relatively permanent type of mounting.

Figure 3:
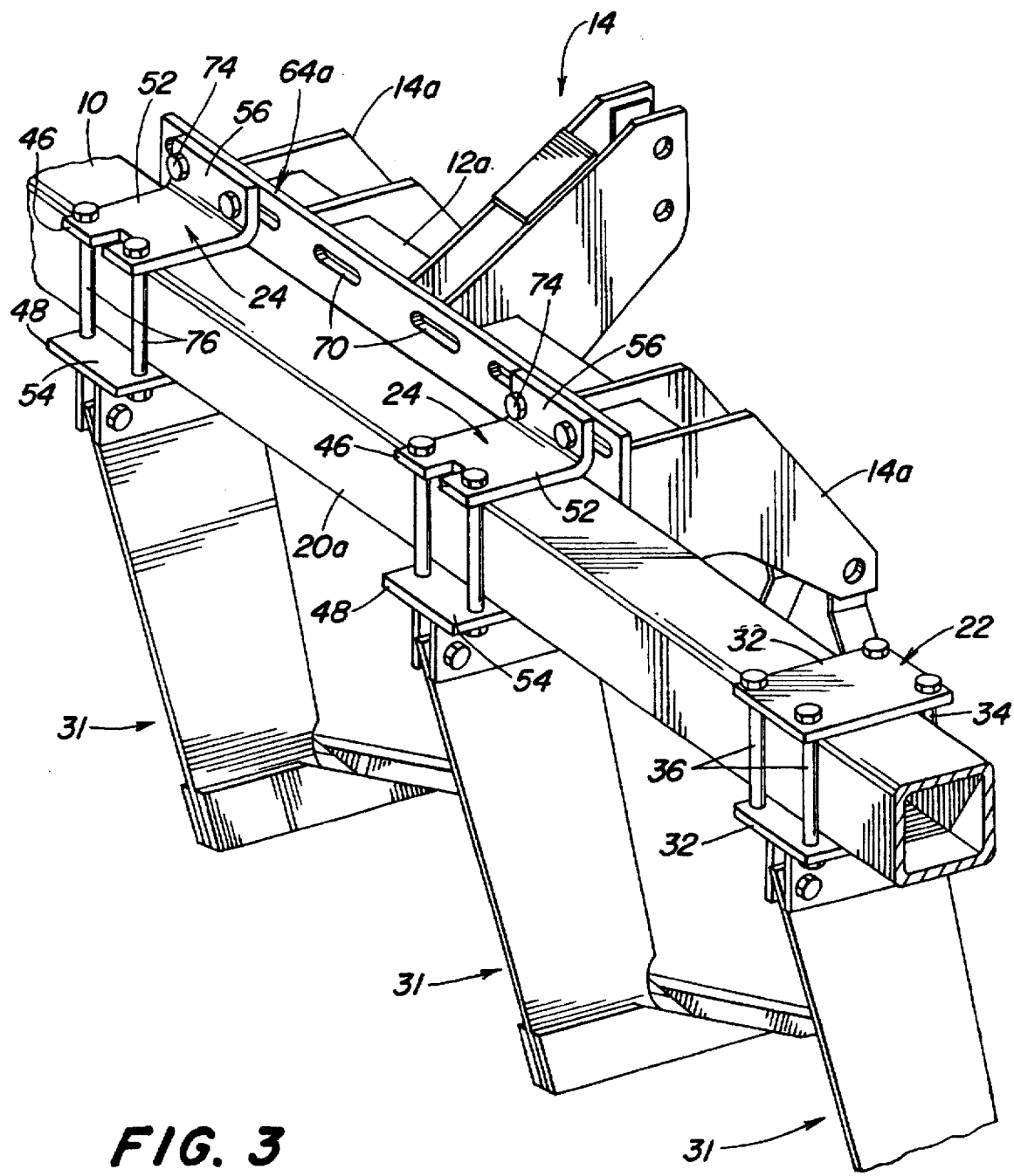
FIG. 3 is a rear perspective view of a portion of a ripper implement with an alternate embodiment of the integral hitch and standard mounting structure.

Bracket structures 22, 24 and 26 are connected to the toolbar 10 and the structures 22 and 24 support earthworking tool assemblies such as spring trip ripper standards 30 as shown in FIG. 2 or fixed ripper standards 31 as shown in FIG. 3. The bracket structure 22 preferably includes upper and lower plate members 32 supported against the top and bottom faces of the toolbar 10 by upright forward bolts 34 extending through forward apertures in the members 32. The bolts 34 include shank portions having diameters which are approximately equal to but slightly less than the spacing (D1) between the forward face of the toolbar 10 and the aft face of the hitch tube 12. Upright bolts 36 extend along the rear face of the toolbar 10 and through rear apertures in the members 32. By loosening the bolts 34 and 36, the bracket structure 22 with attached tool may be slid transversely on the toolbar 10 to the desired location between the bracket 18 and the central section 20.

The brackets 18 are adjustable transversely on the toolbar 10 and the hitch tube 12 and can be easily relocated if a given location interferes with a desired location of one of the brackets 22. The brackets 18 are releasably secured to the toolbar 10 and the tube 12 with bolts 38 and include angles 40 with gripping members 42 to space the toolbar and tube the distance 40 preferably on the order of 0.75 inch (1.9 cm) and provide good load transfer. The brackets 18 provide uniform parallel spacing between the toolbar 10 and the hitch tube 12 and overcome a tendency for distortion between these components brought about by welding the central portion 16 of the hitch tube to the central toolbar section 20.

Figure 4:
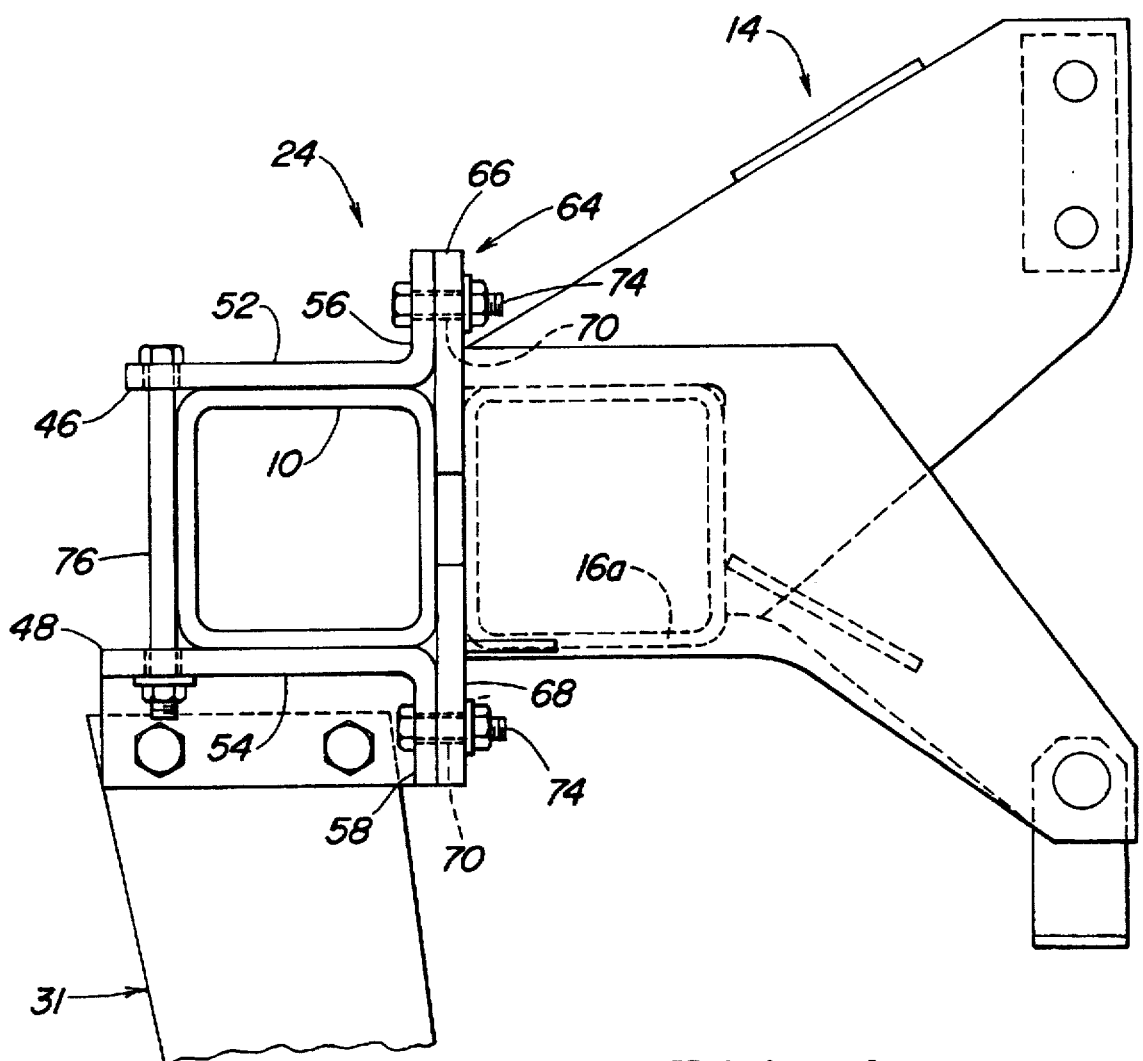
FIG. 4 is an enlarged side view of a portion of the hitch and standard mounting structure of FIG. 3.

In the alternate embodiment of FIGS. 3 and 4, a shortened hitch tube 12a is connected between the hitch members 14a. The tube 12a terminates at the outermost locations of the hitch 14 so that the brackets 22 may be freely positioned along the toolbar 10 outwardly of central hitch area 20a.

The bracket structure 24 includes upper and lower angles or L-shaped members 46 and 48 having apertured horizontal planar legs 52 and 54 and vertical planar legs 56 and 58 (FIG. 4), respectively. The horizontal legs 52 and 54 abut the upper and lower faces of the toolbar 10, and the vertical legs 56 and 58 project upwardly and downwardly, respectively, from the top and bottom faces of the toolbar (FIG. 4) and lie in a plane that corresponds to the plane of the front face of the toolbar. Slotted upright plate structure or bracket support 64 (64a of the alternate embodiment of FIG. 3) includes upper and lower plate members 66 and 68 fixed relative to the front face of the toolbar and having a series of transversely extending slots 70. The aft face of the plate structure 64 also lies generally in the plane corresponding the plane of the front face of the toolbar 10. The vertical legs 56 and 58 abut the aft face of the plate structure 64, and the apertures in the vertical legs align with the slots 70. Horizontally extending bolts 74 extend through the apertures and through the slots 70 to secure the vertical legs 56 and 58 firmly against the aft face of the plate structure 64. Vertical bolts 76 extending adjacent the aft face of the toolbar 10 connect the aft corners of the horizontal legs 52 and 54 and firmly secure the members 46 and 48 against the upper and lower faces of the toolbar. Gussets such as shown at 80 in FIGS. 1 and 2 may be connected between the plate members and the hitch tube 12 for increased strength.

By loosening the bolts 76 and loosening or removing the bolts 74, the bracket structure 24 can be positioned at the desired location relative to the central portion 16 without interference from the hitch 14 and hitch tube 16 or 16a. The bracket structures 22 can also be freely positioned along the toolbar 10 outwardly of the central portion 16. Therefore, the spring trip ripper standards 30 or fixed ripper standards 31 can be easily positioned for virtually any operation, including on row or between row operation, out of interfering relationship with the hitch 14 and/or the brackets 18 (in the embodiment shown in FIGS. 1 and 2). The embodiment of FIGS. 1 and 2 provides excellent load transfer characteristics as well as a versatile tool location function. As shown in FIG. 1, the additional bracket structure 26 for supporting a trailing toolbar and/or additional trailing tools is connected to the toolbar 10 by U-bolts 86 and may be repositioned along the toolbar outwardly of the hitch area by loosening the U-bolts.

Having described the preferred embodiment, it will become apparent that various modifications can be made without departing from the scope of the invention as defined in the accompanying claims.

I claim:

1. In an implement including a transversely extending toolbar with top, bottom, front and rear planar walls, earthworking tool assemblies, first bracket structure connected at transversely spaced locations on the toolbar and facilitating transverse adjustability of the tool assemblies on the toolbar, a hitch member fixed to the toolbar and extending forwardly therefrom at a central location, the hitch member defining interfering locations on the toolbar, wherein placement of the first bracket structure at the interfering locations is hindered, mounting structure facilitating placement of at least one earthworking tool assembly at a selected one of the interfering locations, the mounting structure comprising:

bracket support fixed to the toolbar at the central location and projecting outwardly from at least one of the toolbar walls;

second bracket structure having a toolbar embracing portion and an extension portion adapted to mate with the bracket support adjacent the hitch at the selected one of the interfering locations; and connector structure releasably securing the toolbar embracing portion to the toolbar and the extension portion to the bracket support for maintaining the tool assembly at the selected one of the interfering locations.

2. The mounting structure as set forth in claim 1 wherein the bracket support comprises a plate supported parallel to one of the walls of the toolbar, and the second bracket structure includes a first L-shaped member having a first leg defining the toolbar embracing portion and a second leg defining the extension portion, the second leg extending parallel to and abutting the plate.

3. The mounting structure as set forth in claim 2 wherein the plate includes a slot and the second leg includes an aperture alignable with the slot.

4. The mounting structure as set forth in claim 2 wherein the second bracket structure further includes a second L-shaped member with first and second legs and substantially identical to the first L-shaped member, the first legs of the L-shaped members abutting opposite faces of the toolbar and the second legs of the L-shaped members abutting the plate.

5. The mounting structure as set forth in claim 4 wherein the plate is fixed to the front wall of the toolbar and extends above the top wall and below the bottom wall, and wherein the second legs of the L-shaped members are turned in opposite directions and project, respectively, upwardly above the top face and downwardly below the bottom face.

6. The mounting structure as set forth in claim 5 wherein the plate is slotted and the second legs are apertured facilitating transverse adjustment of the second bracket structure, and wherein the connector structure includes bolt members extending horizontally through the slotted plate and apertured second legs.

7. The mounting structure as set forth in claim 1 including a hitch tube connected to the toolbar and extending parallel to the toolbar, the hitch tube offset forwardly of the central location, and wherein the hitch member is connected to the hitch tube.

8. The mounting structure as set forth in claim 7 wherein the first bracket structure includes upper and lower plate members releasably secured to the toobar by a bolt connected to the plate members, the bolt including a vertical shank portion extending between the hitch tube and the front wall of the toolbar, the plate members when released slidable with the shank portion transversely on the toolbar without need to remove the bolt.

9. The mounting structure as set forth in claim 8 wherein the bracket support and the extension portion include an aperture and a slot, and the connector structure includes a bolt extending through the aperture and the slot whereby the second bracket structure is adjustable transversely along the central location of the toolbar.

10. The mounting structure as set forth in claim 9 including a central mounting whereby the hitch tube is fixed to the toolbar at the central location and limits sliding of the plate members with the bolt connected thereto along the central location.

11. In an implement including a transversely extending toolbar with top, bottom, front and rear planar faces, and a toolbar hitch centrally located on the toolbar and adapted for connection to a tractor, bracket structure for mounting an earthworking tool in a selected one of a plurality of centrally located positions adjacent the toolbar hitch, the bracket structure including a transversely extending bracket support member connected to the toolbar adjacent the hitch at a preselected central toolbar location, and wherein the bracket structure further includes a toolbar embracing portion and an abutting portion, and connecting structure securing the abutting portion against the bracket support member at a selected one of a plurality of adjustable locations including a location directly adjacent the toolbar hitch, the connecting structure urging the embracing portion against the toolbar and facilitating releasable securing of the tool at a selected one of a plurality of locations adjacent the hitch without interference from the hitch.

12. The bracket structure as set forth in claim 11 wherein the bracket support member includes a planar slotted plate extending parallel to the front face of the toolbar.

13. The bracket structure as set forth in claim 12 including an L-shaped member having a horizontal leg extending parallel to the top planar face of the toolbar and defining a portion of the toolbar embracing portion, and a vertical leg extending parallel to the plate and defining the abutting portion.

14. The bracket structure as set forth in claim 13 wherein the vertical leg is apertured, and wherein the connecting structure includes a bolt extending horizontally through the leg aperture and slotted member.

15. The bracket structure as set forth in claim 12 wherein the slotted plate includes upper and lower transversely elongated slotted portions extending above and below the top and bottom, respectively, of the toolbar, and the abutting portion includes upper and lower vertically projecting legs abutting the slotted portions and adjustable transversely therealong.

16. The structure as set forth in claim 11 including a hitch tube connected in parallel offset relationship to the toolbar and supporting the hitch.

17. The structure as set forth in claim 16 wherein the bracket support member is connected to the hitch tube.

18. The structure as set forth in claim 16 wherein the hitch tube is fixed to the toolbar at the central location, and further comprising transversely adjustable spacer brackets connecting the toolbar to the hitch tube outwardly of the central portion and transferring loading from the toolbar to the hitch tube.

19. The structure as set forth in claim 18 including a tool bracket offset outwardly of the bracket support member, the tool bracket including bolt structure extending vertically between the toolbar and hitch tube.

20. The structure as set forth in claim 16 wherein the hitch comprises a three point hitch of preselected width and wherein the hitch tube has a width approximately equal to the preselected width.

\* \* \* \* \*